US012705006B2

(12) United States Patent
Matsuo

(10) Patent No.: US 12,705,006 B2
(45) Date of Patent: Aug. 11, 2026

(54) INDUSTRIAL PRINTING SYSTEM, PRINT SERVER, AND VARIABLE PRINTING METHOD THAT GUARANTEES PRINT QUALITY EVEN WHEN REQUESTING PEER-TO-PEER VARIABLE PRINTING

(71) Applicant: KYOCERA Document Solutions Inc., Osaka (JP)

(72) Inventor: Taku Matsuo, Los Angeles, CA (US)

(73) Assignee: KYOCERA Document Solutions Inc., Osaka (JP)

(*) Notice: Subject to any disclaimer, the term of this patent is extended or adjusted under 35 U.S.C. 154(b) by 330 days.

(21) Appl. No.: 18/537,811

(22) Filed: Dec. 13, 2023

(65) Prior Publication Data

US 2025/0199737 A1 Jun. 19, 2025

(51) Int. Cl.
*G06F 3/12* (2006.01)

(52) U.S. Cl.
CPC ............ *G06F 3/1261* (2013.01); *G06F 3/121* (2013.01); *G06F 3/1243* (2013.01)

(58) Field of Classification Search
CPC ...... G06F 3/1261; G06F 3/121; G06F 3/1234; G06F 3/1243; G06F 3/1208; G06F 3/1282; G06F 3/1288
See application file for complete search history.

(56) References Cited

U.S. PATENT DOCUMENTS 11,847,358 B2 * 12/2023 Anno .................... G06F 3/1208
11,977,803 B1 * 5/2024 Matsuo ................. G06F 3/1282
12,081,715 B2 * 9/2024 Matsuo ................. G06F 3/1288
2015/0156351 A1 6/2015 Yamamoto
2019/0238724 A1 * 8/2019 Fukase ................. H04N 1/6044
2021/0294552 A1 * 9/2021 Fujita .................... G06F 3/1288
2021/0397385 A1 * 12/2021 Tanaka .................... G06F 3/121
2022/0300219 A1 * 9/2022 Kitai ..................... G06F 3/1234
2022/0300227 A1 * 9/2022 Nakayama ............ G06F 3/1234
2023/0068383 A1 * 3/2023 Miyahara .............. G06F 3/1234
2023/0350615 A1 * 11/2023 Kitai ....................... G06F 3/121
2024/0135528 A1 * 4/2024 Shinya ................. H04N 1/0005

FOREIGN PATENT DOCUMENTS

JP 2012-000876 A 1/2012
JP 2015-107555 A 6/2015

* cited by examiner

*Primary Examiner* — Juan M Guillermety

(74) *Attorney, Agent, or Firm* — Hawaii Patent Services; Nathaniel K. Fedde; Kenton N. Fedde

(57) ABSTRACT

Provided is an industrial printing system that guarantees print quality when requesting peer-to-peer variable printing for production printing. An industrial printing system includes a plurality of print servers, printing apparatuses, and inspecting apparatuses, and performs variable printing of print data for production printing. Each of the plurality of print servers includes an inspection master generating unit and a processing management unit. The inspection master generating unit generates master data for inspection in which inspection processing and good-quality standard are set for the print data. The processing management unit transmits the print data and the master data generated by the inspection master generating unit to the other print server and requests processing. The inspecting apparatus inspects the printed matter of the print data based on the master data.

19 Claims, 8 Drawing Sheets

10
CONTROL UNIT
19
STORAGE UNIT
15
NETWORK TRANSMITTING AND RECEIVING UNIT
NETWORK 5
1a, 1b, 1c (1)

FIG. 6

| CHECK AREA (OBJECT) | INSPECTION PROCESSING METHOD | FIXED / VARIABLE | DATA SOURCE | GOOD-QUALITY STANDARD |
|---|---|---|---|---|
| FIXED IMAGE A | SCAN (HIGH) | FIXED | MASTER DATA: 0001 | COLOR DIFFERENCE XX OR LESS & NUMBER OF PIXELS XX OR LESS |
| VARIABLE CHARACTER STRING A | OCR CHECK | VARIABLE | VARIABLE DATA: MESSAGE | EXACT MATCH |
| VARIABLE CHARACTER STRING B | OCR | CHECK | VARIABLE | VARIABLE DATA: ADDRESS |
| VARIABLE IMAGE A | SCAN (LOW) | VARIABLE | VARIABLE DATA: IMAGE | COLOR DIFFERENCE XX OR LESS & PIXEL NUMBER XX OR LESS |
| BARCODE DATA A | BARCODE SCAN | VARIABLE | VARIABLE DATA: URL | EXACT MATCH |

PRINTING LINE A
PRINTING LINE B
PRINTING LINE C
1a
(OWN PRINT SERVER)
2a
PRINTING APPARATUS
3a
INSPECTING APPARATUS
1b
(OTHER PRINT SERVER)
2b
PRINTING APPARATUS
3b
INSPECTING APPARATUS
200
PRINT DATA
210
MASTER DATA
POOR-QUALITY REPORT
INSPEC-TION RESULT
1 c
(OTHER PRINT SERVER)
2c
PRINTING APPARATUS
3c
INSPECTING APPARATUS
INSPECTION RESULT

INDUSTRIAL PRINTING SYSTEM, PRINT SERVER, AND VARIABLE PRINTING METHOD THAT GUARANTEES PRINT QUALITY EVEN WHEN REQUESTING PEER-TO-PEER VARIABLE PRINTING

BACKGROUND

The present disclosure particularly relates to an industrial printing system, a print server, and a variable printing method that perform variable printing in industrial printing (production printing).

Among typical printing systems including a plurality of printers, there is a printing system that performs so-called ubiquitous printing. This system is a print system that includes multiple printers (MFPs), and when a ubiquitous job is received from the PC that issued the ubiquitous job, the first MFP stores the print settings in the memory if the print settings can be processed by its own print function. If it cannot be processed, it is transferred to the next MFP. This process is performed in a predefined order from the first MFP to the Nth MFP. As a result, the ubiquitous job is stored in the memory of the MFP that can process it. As a result, in the printing system, the waiting time for the user to obtain printed matter can be reduced.

On the other hand, in industrial printing called production printing, which uses commercial (industrial) printing apparatus, components of the final product are manufactured by dividing labor into multiple processes. For example, in the case of bookbinding, the cover, main body (color), main body (black and white), promotional materials, bands, shipping envelopes, or the like, are processed as different jobs. Then, in the middle of the processes, each job is combined to generate the final product, a book.

Furthermore, in recent years, industrial printing in which the output changes for each record, called variable printing, has been used in digital printing for production printing. Variable printing is used for personalized printed matters and the like. Variable printing is one of the purposes for printing companies to introduce digital production printing apparatus.

SUMMARY

An industrial printing system according to the present disclosure includes an industrial printing system having a plurality of print servers, printing apparatuses, and inspecting apparatuses and performing variable printing of print data for production printing, and each of the plurality of print servers includes: an inspection master generating unit that generates master data for inspection in which inspection processing and good-quality standard are set for the print data; a processing management unit that transmits the print data and the master data generated by the inspection master generating unit to other print server and requests processing; and the inspecting apparatus inspects printed matter of the print data based on the master data.

A print server according to the present disclosure is a print server for an industrial printing system that performs variable printing of print data for production printing, including: an inspection master generating unit that generates master data for inspection in which inspection processing and good-quality standard are set for the print data; a processing management unit that transmits the print data and the master data generated by the inspection master generating unit to other print server and requests processing.

A variable printing method of the present disclosure is a variable printing method executed by an industrial printing system having a plurality of print servers including own print server and other print server and performing variable printing of print data for production printing, including the steps of: by the own print server, generating master data for inspection in which inspection processing and good-quality standard are set for the print data; by the own print server, transmitting the print data and the generated master data to other print server and requesting processing; by an inspecting apparatus of the other print server, inspecting printed matter of the print data based on the master data.

BRIEF DESCRIPTION OF THE DRAWINGS

FIG. 6 is a conceptual diagram of a processing standard setting generated in a master data generation process as shown in FIG. 4;

FIG. 7 is a conceptual diagram of master data generation process in the master data generation process as shown in FIG. 4.

DETAILED DESCRIPTION

Embodiment

[Configuration of Industrial Printing System X]

Figure 1:
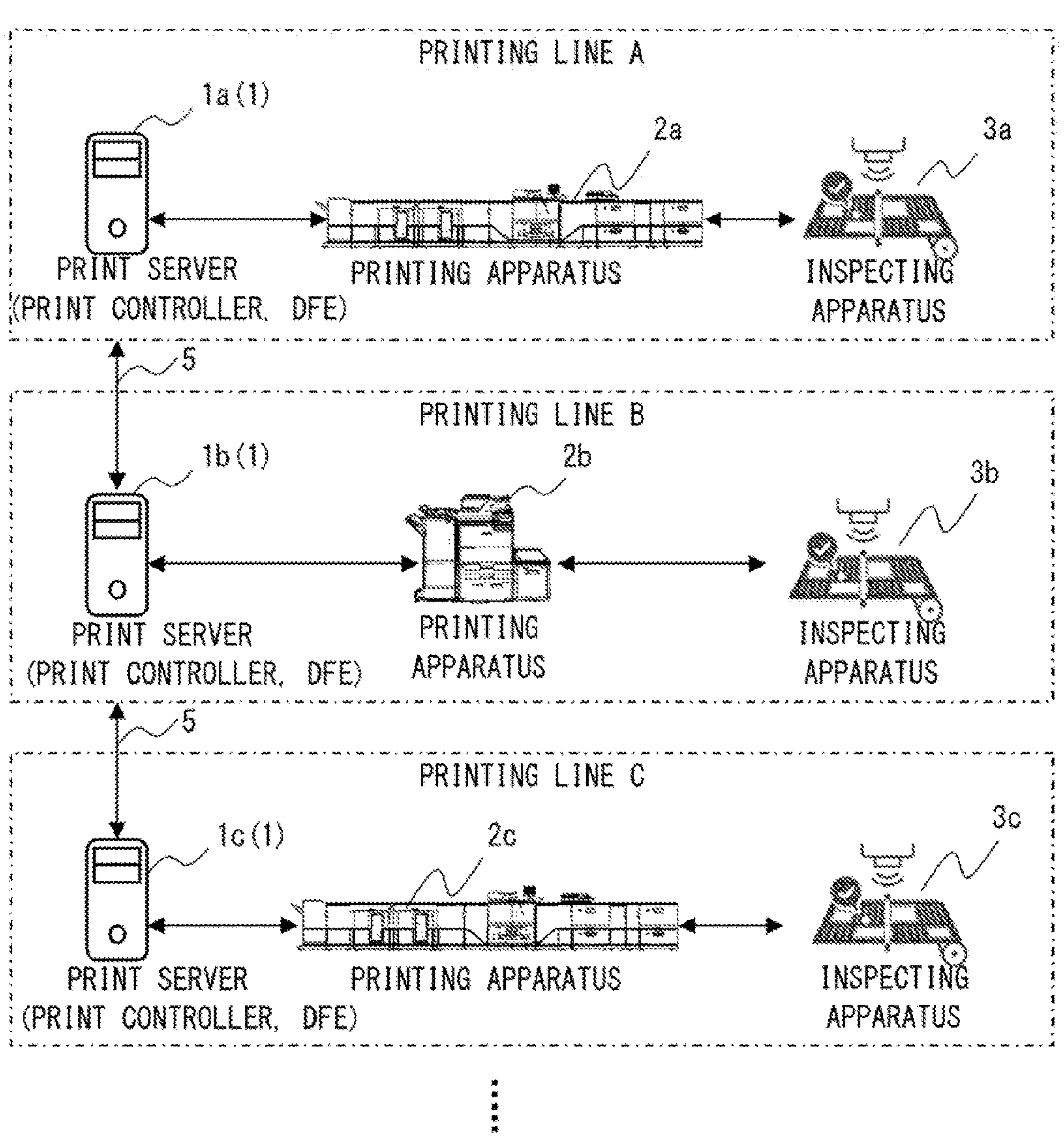
FIG. 1 is an example of a system configuration figure of an industrial printing system according to an embodiment of the present disclosure.

Firstly, with reference to FIG. 1, an example of the overall system configuration of the industrial printing system X according to the present embodiment is described.

The industrial printing system X is a system that performs variable printing of print data 200 (FIG. 3) for industrial printing (production printing). In the present embodiment, the industrial printing system X executes output through a printing process and post-processing process (hereinafter also simply referred to as "printing") in production printing and performs inspection of the output printed matter (hereinafter simply referred to as "inspection").

Here, in the industrial printing system X according to the present embodiment, a final product such as a book to be output is an "order," print data 200 (FIG. 3) is printed as the order, and the printed matter is inspected.

In the industrial printing system X, sites (printing lines) such as printing companies and printing factories equipped with a print server 1 and component apparatuses (groups) are connected via a network 5 and cooperated with. In the present embodiment, the component apparatus is printing-related apparatus including a printing apparatus 2, an inspecting apparatus 3, and the like.

FIG. 1 shows an example in which print servers 1_a_, 1_b_, 1_c_, . . . in print lines A, B, C, . . . are connected with the network 5. Furthermore, in this example, in print lines A, B, C, . . . , printing apparatuses 2*a*, 2*b*, 2*c*, . . . and inspecting apparatuses 3*a*, 3*b*, 3*c*, . . . are connected with print servers 1*a*, 1*b*, 1*c*, . . . .

Hereinafter, when any one of these print servers 1*a*, 1*b*, 1*c*, . . . is simply referred to as a print server 1. Similarly, when any one of the printing apparatuses 2*a*, 2*b*, 2*c*, . . . is simply referred to as the printing apparatus 2. Similarly, when any one of the inspecting apparatuses 3*a*, 3*b*, 3*c*, . . . is simply referred to as the inspecting apparatus 3.

Specifically, the print server 1 is an information processing apparatus that serves as a print controller or DFE (Digital Front End), which manages and controls printing-related apparatuses (hereinafter referred to as a "component apparatus"). The print server 1 is configured by using such as a PC (Personal Computer) server, a dedicated machine, a general-purpose machine, and the like. In the present embodiment, by executing an application software (hereinafter simply referred to as an "application") for dedicated print management (order output management), the print server 1 performs distributed processing of print data 200 (as refer to FIG. 3) in peer-to-peer production printing. This print management application (hereinafter referred to as a "dedicated application") may perform a common platform for creating print designs, user management, tenant management, security management, maintenance notification services, prepress processing management, storage management for each document, and printing apparatus 2 management, inspecting printed matter, or the like.

In the present embodiment, the print server 1 sends and receives various instructions and information to and from the printing apparatus 2 and the inspecting apparatus 3 during production printing. Thereby, the print server 1 requests the processing of the print data 200, inspects printed matters, and manages the status of each apparatus.

In the present embodiment, the print server 1 that is the processing request source (the side that requests processing) is hereinafter referred to as a "own print server." On the other hand, the print server 1 to which the processing is requested is hereinafter referred to as an "other print server." That is, in the present embodiment, the own print server requests processing of the print data 200, and the other print server transmits an inspection result and reports "poor-quality," where quality cannot be guaranteed as a result of inspection (hereinafter simply referred to as a "poor-quality report").

The printing apparatus 2 is an industrial printer including an image forming apparatus, an automated offset printing apparatus, or the like. The printing apparatus 2 is capable of performing processing of printing processes such as small-lot printing or large-volume (multi-lot) offset printing. In the present embodiment, the printing apparatus 2 may include a post-processing equipment (post-processing apparatus) for performing processing of post-processing processes such as folding, collating, bookbinding, cutting, bookbinding, and the like, for the printed recording papers.

The inspecting apparatus 3 is an apparatus that inspects printed matter. The inspecting apparatus includes, for example, an imaging device such as a scanner or a camera that scans or images the printed matter, a paper feeding mechanism, a controller (information processing device) capable of OCR (Optical Character Recognition) or image recognition, and the like.

Figure 3:
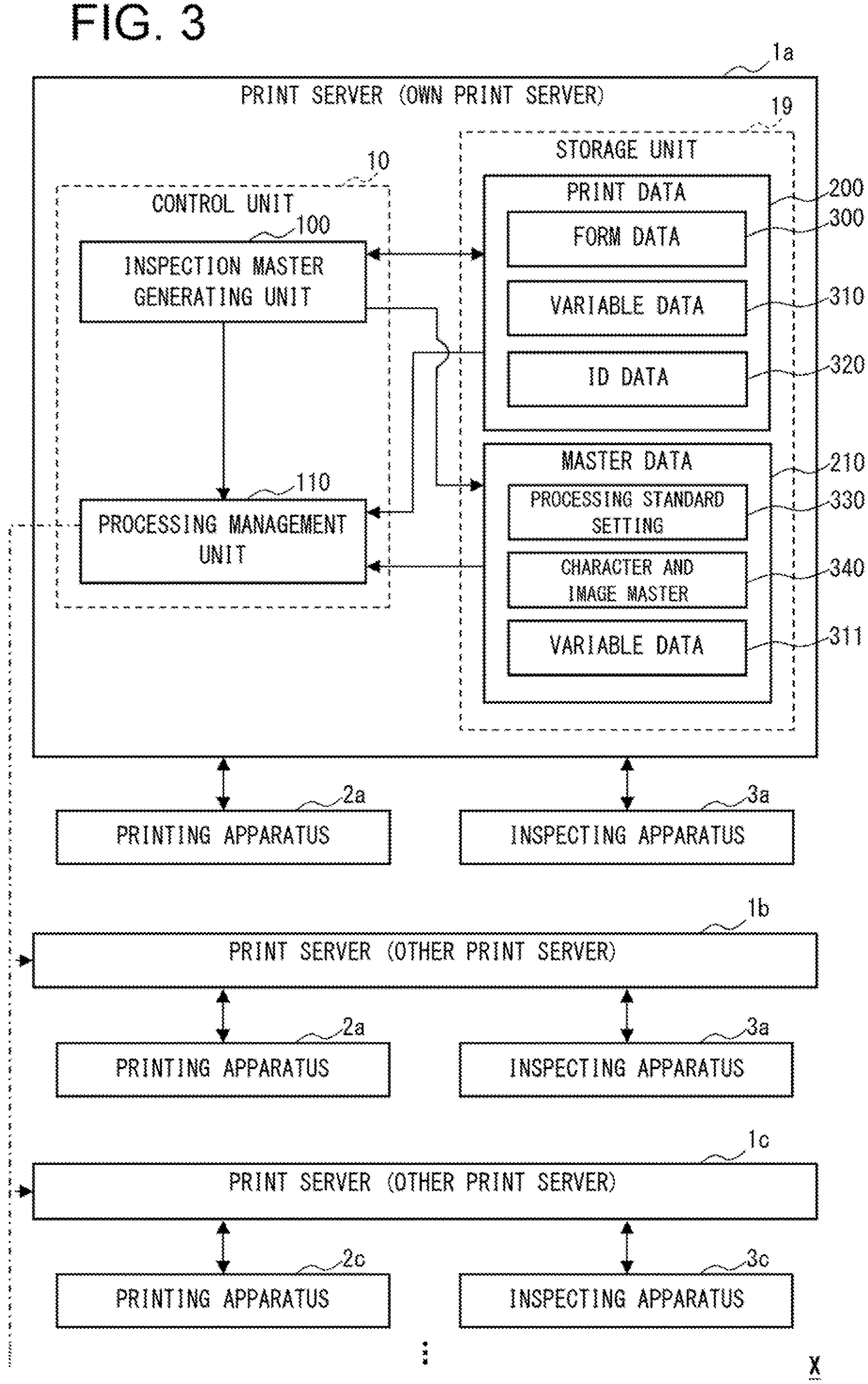
FIG. 3 is a block diagram showing the functional configuration of the print server as shown in FIG. 1.

In the present embodiment, the inspecting apparatus 3 images printed matter and performs inspection based on the master data 210 (FIG. 3). This printed matter may be printed by the printing apparatus 2 at the same site based on the print data 200. At the time of inspection, the inspecting apparatus 3 is also capable of identifying one-dimensional and two-dimensional barcodes in addition to characters. In addition, the inspecting apparatus 3 can perform inspection after printing, before or after post-processing.

The network 5 is a LAN (Local Area Network), a wireless LAN (Wi-Fi), a mobile phone network, the other WAN (Wide Area Network), an industrial network, a voice telephone network, the other dedicated line, or the like. The network 5 is capable of transmitting and receiving various commands and data to and from each apparatus. Furthermore, the print server 1 and each component apparatus may also be connected via a LAN within the network 5, USB (Universal Serial Bus), or the like. In addition, the network 5 may be configured with a VPN (Virtual Private Network), or the like.

In addition, as component apparatuses (groups) according to the present embodiment, in the industrial printing system X, a design apparatus that designs, or the like, to have variable printing to be performed, a management apparatus that manages the status of each apparatus and requests processing, a terminal that is used by an administrator and other users, and a shipping server that manages the shipping of orders sent from each site after the printing process or post-processing process is completed, may be provided.

In addition, a plurality of these apparatuses may exist depending on the purpose, scale of printing, and the like. Each apparatus can be connected with the print server 1 via a network 5, or the like, by using various protocols. Alternatively, the print server 1 and each apparatus may be directly connected by wire using various interfaces.

In addition, each site may be provided with other types of component apparatuses managed by the print server 1.

[Control Configuration of Print Server 1]

Figure 2:
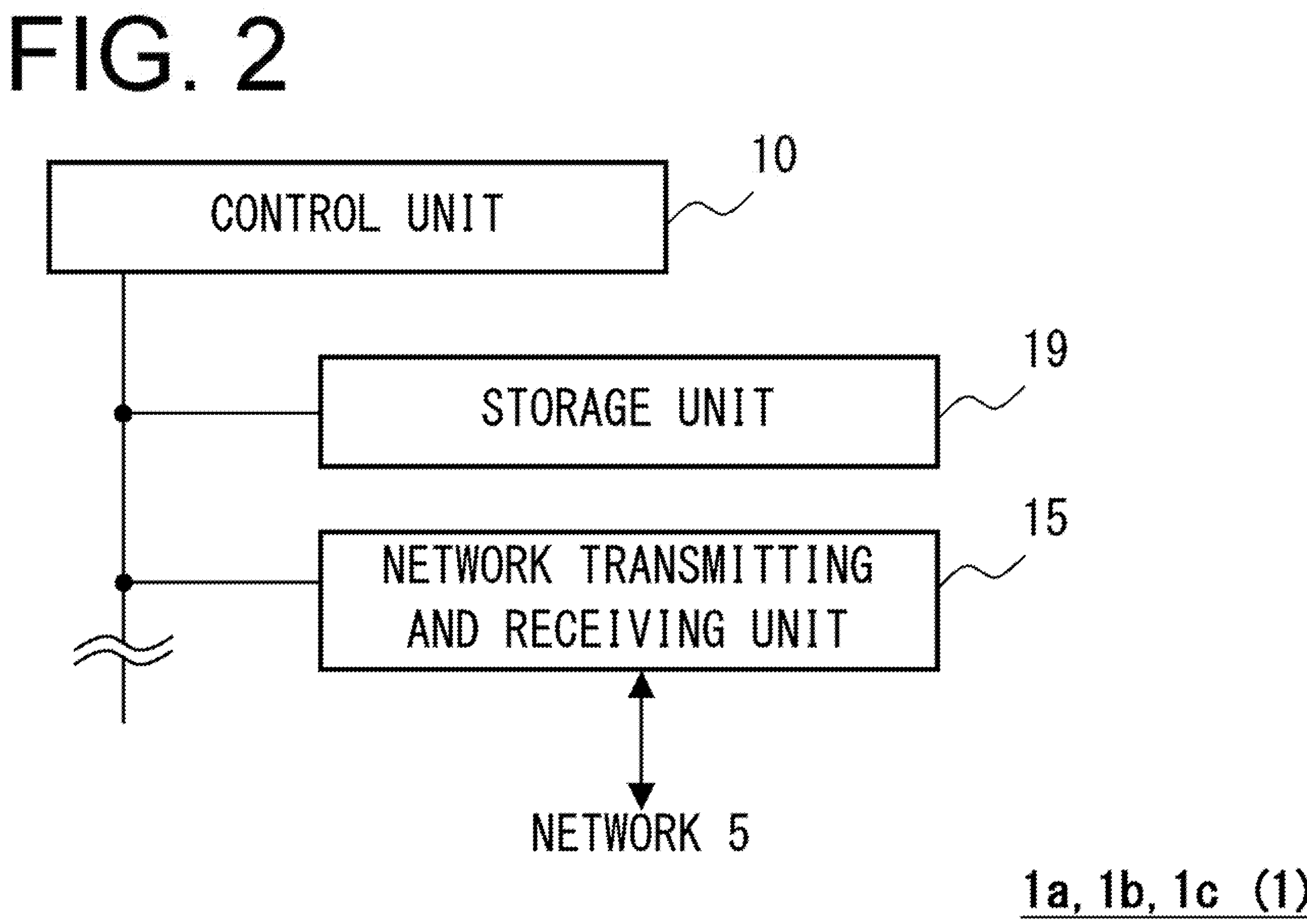
FIG. 2 is a block diagram showing the control configuration of the print server as shown in FIG. 1.

Then, the control configuration of the print server 1 is described with reference to FIG. 2.

The print server 1 includes a control unit 10, a network transmitting and receiving unit 15, a storage unit 19, and the like. Each unit is connected with the control unit 10 and its operation is controlled by the control unit 10.

The control unit 10 is an information processing unit such as a GPP (General Purpose Processor), a CPU (Central Processing Unit), an MPU (Micro Processing Unit), a DSP (Digital Signal Processor), a GPU (Graphics Processing Unit), an ASIC (Application Specific Integrated Circuit), or the like.

The control unit 10 reads a control program stored in the ROM or HDD of the storage unit 19, develops the control program in the RAM, and executes it, thereby operating as each unit of the functional blocks as described later. Further, the control unit 10 controls the entire apparatus according to instruction information input from an administrator terminal or a general terminal.

The network transmitting and receiving unit 15 is a network connecting unit including a LAN board, a wireless transmitting and receiving apparatus, or the like, for connecting with the network 5.

The network transmitting and receiving unit 15 transmits and receives data over a data communication line, and it transmits and receives voice signals over a voice telephone line.

The storage unit 19 is a non-transitory recording medium including semiconductor memory such as ROM (Read Only Memory) and RAM (Random Access Memory), a magnetic storage such as HDD (Hard Disk Drive), and the like.

A control program for controlling the operation of the print server 1 is stored in the ROM or HDD of the storage unit 19. This control program includes an OS (Operating System), middleware on the OS, services (daemons), various applications, database data, and the like. Among these, the various applications include the above-mentioned dedicated application.

In the present embodiment, the storage unit 19 stores processing programs and data of a raster in-process (hereinafter simply referred as "rasterization" or "RIP") that converts vector (line drawing) image data into printing image data (raster data). The rasterization processing program and data also include commercial libraries, fonts, and the like. Each print server 1 may have different commercial libraries, fonts, or the like, and such difference or other causes may result in different output results of the print data 200 (as refer to FIG. 3). However, if this difference exceeds acceptable limits, it may be a poor-quality report.

In addition, the storage unit 19 also stores information and a control program for each component apparatus connected with the same print line. This control program includes a device driver, middleware, or the like, to instruct for the printing apparatus 2 and the inspecting apparatus 3.

Furthermore, the storage unit 19 may also store distribution destination settings indicating other print servers in distribution destinations to which processing is requested, account settings for users of the industrial printing system X, other data, and the like.

In addition, in the print server 1, the control unit 10 may be integrally formed, such as a CPU with a built-in GPU, a chip-on-module package, an SOC (System On a Chip), or the like. Further, the control unit 10 may have a built-in RAM, ROM, flash memory, or the like.

[Functional Configuration of Print Server 1]

Here, with reference to FIG. 3, the functional configuration of the print server 1 is described.

The control unit 10 of the print server 1 includes an inspection master generating unit 100 and a processing management unit 110.

The storage unit 19 stores print data 200 and master data 210.

The inspection master generating unit 100 generates master data 210 for inspection in which inspection processing and good-quality standard are set for the print data 200.

In the case of the own print server, the processing management unit 110 transmits the print data 200 and the master data 210 generated by the inspection master generating unit 100 to the other print server and requests processing. At this time, the processing management unit 110 may determine to select the other print server based on the distribution destination settings stored in the storage unit 19. The processing management unit 110 can also send a job ticket including print data 200 to the other print server to request processing of printing and post-processing. Here, if there is a poor-quality report from the other print server, the processing management unit 110 sets a print server 1 different from the other print server in which the poor-quality reported as a new other print server. Then, the processing management unit 110 transmits the corresponding print data 200 to the newly set other print server and requests processing.

In the case of the other print server, the processing management unit 110 generates the job ticket and causes the printing apparatus 2 of the printing process of the component apparatus to print it. After the printing, the printed matter may be performed post-processing by a post-processing apparatus. The processing management unit 110 determines if the printed matter is inspected as poor-quality by the inspection apparatus 3. In this case, the processing management unit 110 selects, based on the master data 210, whether to print again or to send the poor-quality report to the print server that requested the processing (the own print server.)

In addition, in the present embodiment, the inspecting apparatus 3 inspects the printed matter printed with the print data 200 based on the master data 210. In the present embodiment, the inspecting apparatus 3 inspects each record. In the present embodiment, the inspecting apparatus 3 reads the printed ID by the ID data 320 to identify the record.

At this time, the processing management unit 110 of the other print server causes the inspecting apparatus 3 to inspect the record unit in accordance with the received master data 210.

The print data 200 is data of a job for a variable printing that includes a variable document used during variable printing and various data related thereto (hereinafter referred to as a "variable job"). Specifically, the print data 200 is data of a print document where the design has been set according to the order. The print data 200 may be written in JDF (Job Description Format) and/or JMF (Job Messaging Format). This JDF and/or JMF may include, for example, PDF (Portable Document Format), PS (Post Script) data, other vector data, data in a submission format, other raster image data, and the like. The details of the print data 200 is described later.

The master data 210 is data in which image or text data of an inspection master to be compared for inspection, how to inspect the inspecting apparatus 3, or the like, are set. In the present embodiment, by comparing the master data 210 with various inspection processing methods, it is possible to ensure quality when output is performed at each processing request destination.

The details of the master data 210 will also be described later.

(Details of Print Data 200)

Then, the details of the print data 200 is explained. In the present embodiment, print data 200 includes form data 300, variable data 310, and ID data 320. These data may be included in the print data 200 as attribute data.

The form data 300 is data including a common form for performing variable printing. This common form is essentially unchanged (fixed) area at the time of printing. Specifically, the form data 300 may be, for example, data in PDF, PS, PDL (Page Description Language), XML (Extensible Markup Language) format, PPML (Personalized Print Markup Language), or the like. Among these, the PDF may be PDF/X, which is a subset of the standard PDF defined by the International Organization for Standardization (ISO15930), a simpler PDF, or the like.

Furthermore, the form data 300 may include, for example, image data such as jpg, gif, BMP, PNG, and TIFF, other document data, and other data. In addition, the form data 300 may include layout information that defines the layout, or the like, on the page. This layout information may include format information such as the position (coordinates) and size of the form on the page, the font size of the variable data 310, left alignment, center alignment, right alignment, or the like.

In addition, the form data 300 may also include definitions of elements of the variable data 310, data explaining items of the elements, data indicating targets of attributes, and the like.

The variable data 310 is data for variable output that changes the print content during printing. The variable data 310 may be embedded in the print data 200, for example, in a table format including a plurality of records, a database format such as XML, or the like.

Alternatively, the variable data 310 may be added separately as a file in a format that is easy to handle as a database. In such case, the variable data 310 may be a database such as a tab-delimited or comma-delimited file, a spreadsheet application file, other types of database files, list files, or the like.

The ID data 320 is data of ID printed for each record. The ID data 320 may be, for example, an image object or character data for drawing characters and numbers, a one-dimensional or two-dimensional bar code, or the like, of the ID for inspection. This image object or character data may be configured to be printed on an area that is cut and removed in post-processing, a cover, or the like.

In addition to this, the print data 200 may also include job type, project (order) name, various processing attribute information, print resources, and the like. The processing attribute information may be set the number of copies, whether or not to collate, whether or not to record, the number of mm to cut, printing direction, printing status, priority order, or the like. Among these, the job type includes a job for printing processes (a print job) and a job for post-processing processes (a post-processing job). The print resource is information on various resources necessary for printing instructions, such as an ICC profile, or the like. The other resource data necessary for printing is also included in the print resource.

Further, at least part of the print data 200 may be written in a format compatible with JDF and/or JMF.

(Details of Master Data 210)

Figure 4:
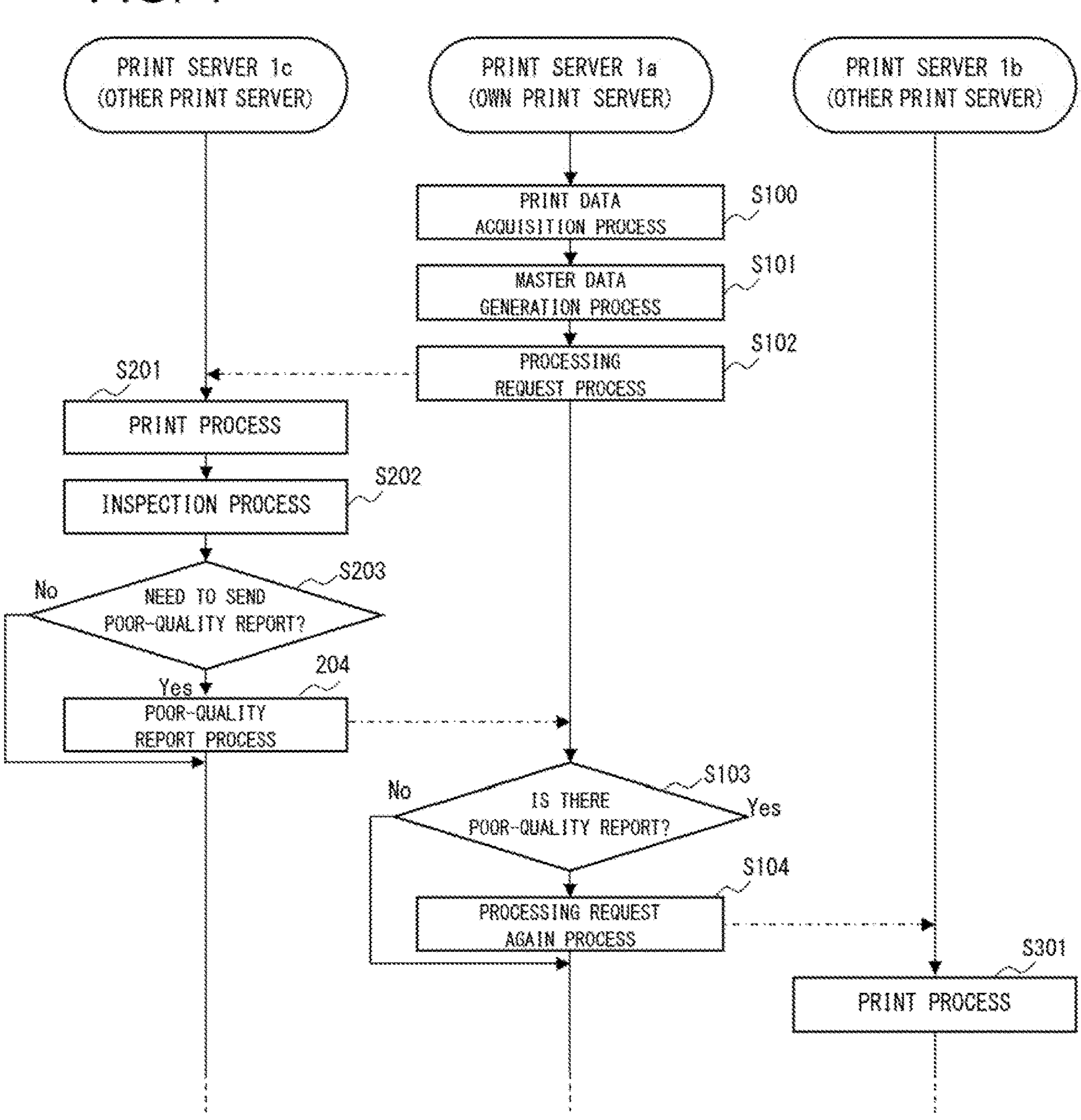
FIG. 4 is a flowchart of a variable quality guarantee process according to an embodiment of the present disclosure.

Then, with reference to FIG. 4, the details of the master data 210 is explained.

In the present embodiment, master data 210 includes a processing standard setting 330, a character and image master 340, and variable data 311.

The processing standard setting 330 is data that is set for each object of the print data 200 and indicates an inspection processing method and a good-quality standard for inspection. The inspection processing method indicates a method of processing how it compares with the master. Specifically, as the inspection processing method, it is possible to set, for example, a process performed by the inspecting apparatus 3 during inspection, such as OCR check, scanning, barcode scanning, and the like. For each method, it is also possible to set in more detail. For example, in the case of OCR checking, a threshold value for the matching rate of recognized characters, complete matching, or the like, can be set. In the case of scanning, as the resolution (Dot Per Inch), "High," "Mid," "Low," or the like, can also be set. Here, the good-quality standard can be set according to the inspection processing method. For example, in the case of scanning, threshold values, or the like, for color difference and pixel number difference can be set. This threshold value may vary depending on the resolution mentioned above. For example, if the resolution is low, a threshold value may be set that allows differences due to some scratches, shifts, or the like. Otherwise, if the resolution is high, a threshold value may be set such that the tolerance for difference is more stricter.

Furthermore, the processing standard setting 330 can also set a threshold value, or the like, of a reporting standard for whether to print again on the other print server or to send the poor-quality report to the own print server of the requesting source. The threshold value of this reporting standard may be set based on criteria such as whether the quality may be improved by printing again due to dirt, dust, print misalignment, ink or equipment malfunction, or the like, or whether or not proper printing is possible with the printing apparatus 2 on the other print server.

In addition, the processing standard setting 330 include the coordinates of the area of the object to be checked by the inspecting apparatus 3 in the print data 200, the name and ID of the object, information indicating whether it is fixed data in the form or variable data 310, and data related to inspection master. This data related to inspection master includes the data of the characters or images in the corresponding the character and image master 340.

In addition, the processing standard setting 330 may include data indicating the processing capacity of the print server 1 when performing rasterization. For example, the processing standard setting 330 include color profile information including information such as an ICC profile, or the like, spot color information including commercial library information related to color specification, font information including commercial font information, image processing information, and plug-in information related to plug-in processing. Further, the processing standard setting 330 may include information of processing capacity that can be performed in the printing process and the post-processing process by the printing apparatus 2.

The character and image master 340 is character data of an object for inspection, image data of an area of the object, or the like, and it serves as an inspection master for comparison. In the character and image master 340, for example, whether the inspection master is a fixed image or character string, whether it is variable (variable) data to be obtained from variable data 310 or not, and data source (location) of the image or character string, or the like, can be set. Specifically, the inspection master set in the character and image master 340 may be the character data or image data itself, or it may be information about the location of the data source of the character data or image data. As the location of the data source, the location of an image, character string, variable data 311 in the print data 200, or an external URL (Uniform Resource Locator) can be set.

The variable data 311 is data for inspecting each record of the print data 200. The variable data 311 may be a subset or reduced data generated by extracting a portion of the variable data 310 of the print data 200 for inspection.

In addition to this, the storage unit 19 may also include a distribution condition data related to the job ticket and the job distribution. This job ticket is setting data for requesting a print or post-processing job. The setting data includes, for example, necessary settings including imposition position and post-processing. Further, the job ticket may also be written in JDF and/or JMF.

Here, the control unit 10 of the print server 1 is made to function as the inspection master generating unit 100, the process management unit 110, and the process management unit 110 by executing a control program stored in the storage unit 19.

Further, each part of the print server 1 as described above becomes a hardware resource for executing the variable printing method of the present disclosure.

In addition, a part or any combination of the above functional configurations may be configured in terms of hardware or circuitry by using an IC, programmable logic, FPGA (Field-Programmable Gate Array), or the like.

[Variable Quality Guarantee Process Using Industrial Printing System X]

Then, with reference to FIGS. 4 to 8, variable quality guarantee process for executing the variable printing method by the print server 1 according to the embodiment of the present disclosure is described.

In the variable quality guarantee process of the present embodiment, the print server itself generates inspection master data 210 for the print data 200 in which the inspection processing and the good-quality standard are set. Then, the print data 200 and the generated master data 210 are sent to the other print server to request processing. Here, the other print server causes the inspecting apparatus 3 to inspect the printed matter printed with the print data 200 based on the master data 210.

In the variable quality guarantee process according to the present embodiment, as a typical example, the print server 1*a* of print line A is the own print server (the side to request processing, the request source), and the print servers 1*b* and 1*c* of print lines B and C are the other print servers (processing requested side, distribution destination). Here, an example is described in which the print server 1*a* first selects the print server 1*c* as the other print server.

In the variable quality guarantee process according to the present embodiment, an example is described in which the control unit 10 of each print server 1 executes a program stored in the storage unit 19 by using hardware resources in cooperation with each unit.

In the following, with reference to the flowchart of FIG. 4, the details of the variable quality guarantee process is explained step by step.

(Step S100)

Firstly, the inspection master generating unit 100 performs a print data acquisition process.

The inspection master generating unit 100 acquires print data 200 to be subjected to distributed processing from a design apparatus, an administrator terminal, or the like.

Alternatively, the inspection master generating unit 100 may generate the print data 200 on a peer-to-peer basis in cooperation with the design apparatus or the administrator terminal. In this case, a web browser or a dedicated application may be executed on the design apparatus or the administrator terminal, and the print data 200 may be created from template data on a screen of the dedicated application by using a GUI (Graphical User Interface).

When generating the print data 200, settings for generating the master data 210, settings for the processing standard setting 330, or the like, may be performed.

Figure 5:
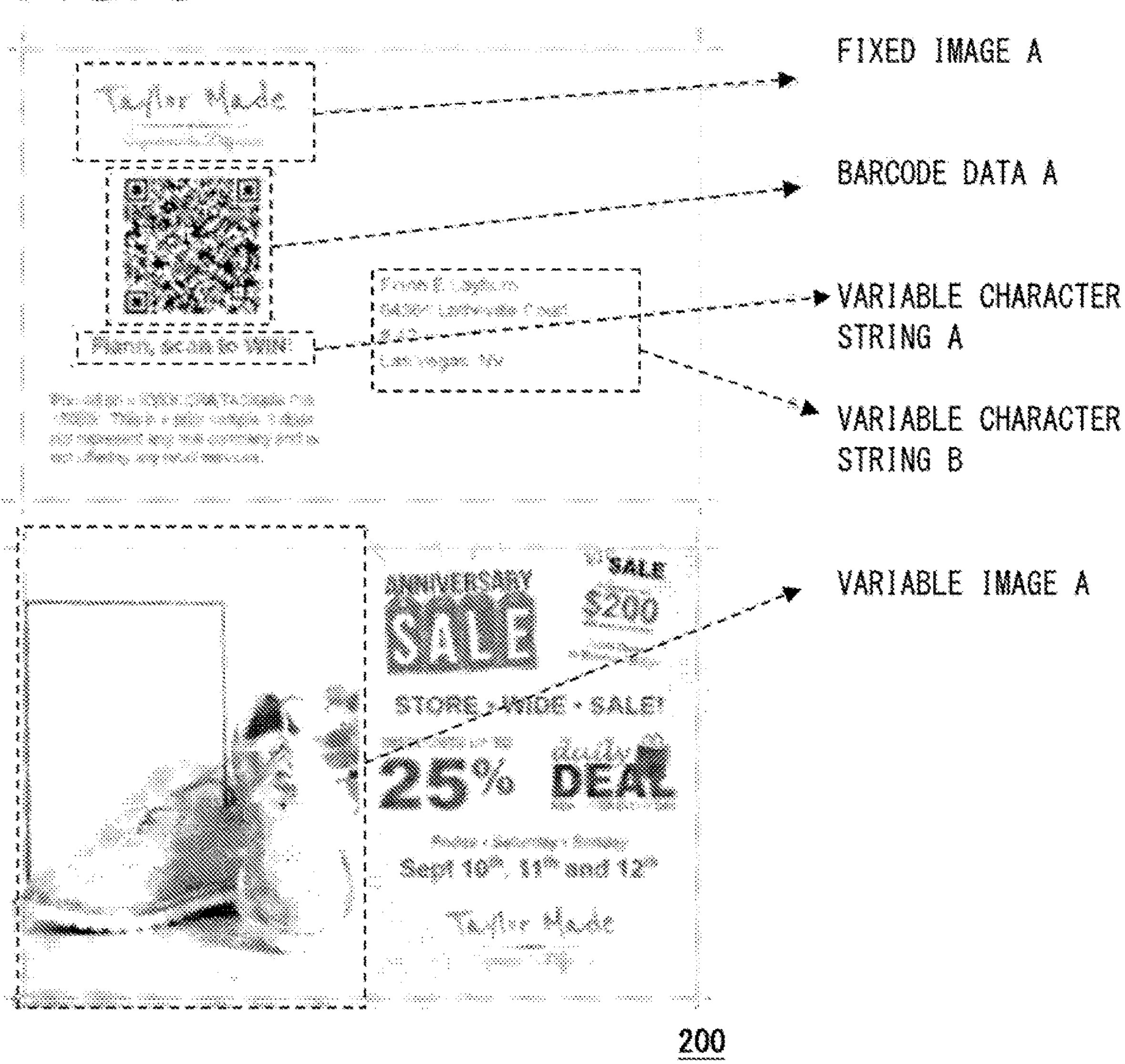
FIG. 5 is a conceptual diagram of a master data generation process as shown in FIG. 4.

FIG. 5 shows an example of a printed matter of the generated print data 200 and where to be inspected. In this example, a four-page booklet is printed. Among these images, there is an area of an object that do not change (fixed) for each record, which is in the form data 300. In this example, an image of “fixed image A” is inspected. There is also an area of an object that changes with each record (variable), which is printed based on the variable data 310. The areas of variable objects includes “Barcode Data A,” which is an image of a two-dimensional barcode, “variable character strings A and B,” which are the character sequences, and “variable image A,” which is an image.

(Step S101)

Then, the inspection master generating unit 100 performs a master data generation process.

The inspection master generating unit 100 sets master data 210 for the print data 200 based on a macro language, user designation by using a CUI or GUI, and the like.

The inspection master generating unit 100 generates processing standard setting 330 for the print data 200 in which inspection processing and good-quality standard are set.

At this time, the inspection master generating unit 100 specifies the area of each object to be checked during inspection within the print data 200, and it generates the master data 210 including text information, images at specific areas, and the like. As the object, for example, as described above, areas may be identified by categories such as the “fixed string” that is the fixed character string object, the “variable string” that is the variable character string object, the “fixed image” that is the fixed image object, and the “variable image” or “barcode data” that is the variable image object. Then, the inspection master generating unit 100 sets the inspection processing method and the good-quality standard for inspection in the processing standard setting 330 for each identified area. In addition, the inspection master generating unit 100 can be set to include data in the master data 210, specify a location on the print data 200, or specify a URL as a separate file as the data source for the text and images of each object.

FIG. 6 shows an example of settings for the inspection processing method, fixed or variable, data source, and good-quality standard for each object area (check area) as in FIG. 5 as described above.

Here, as for the variable object area, the inspection master generating unit 100 may extract only the record information for that area in the print data 200 and include the master data 210 as the variable data 311.

Figure 7:
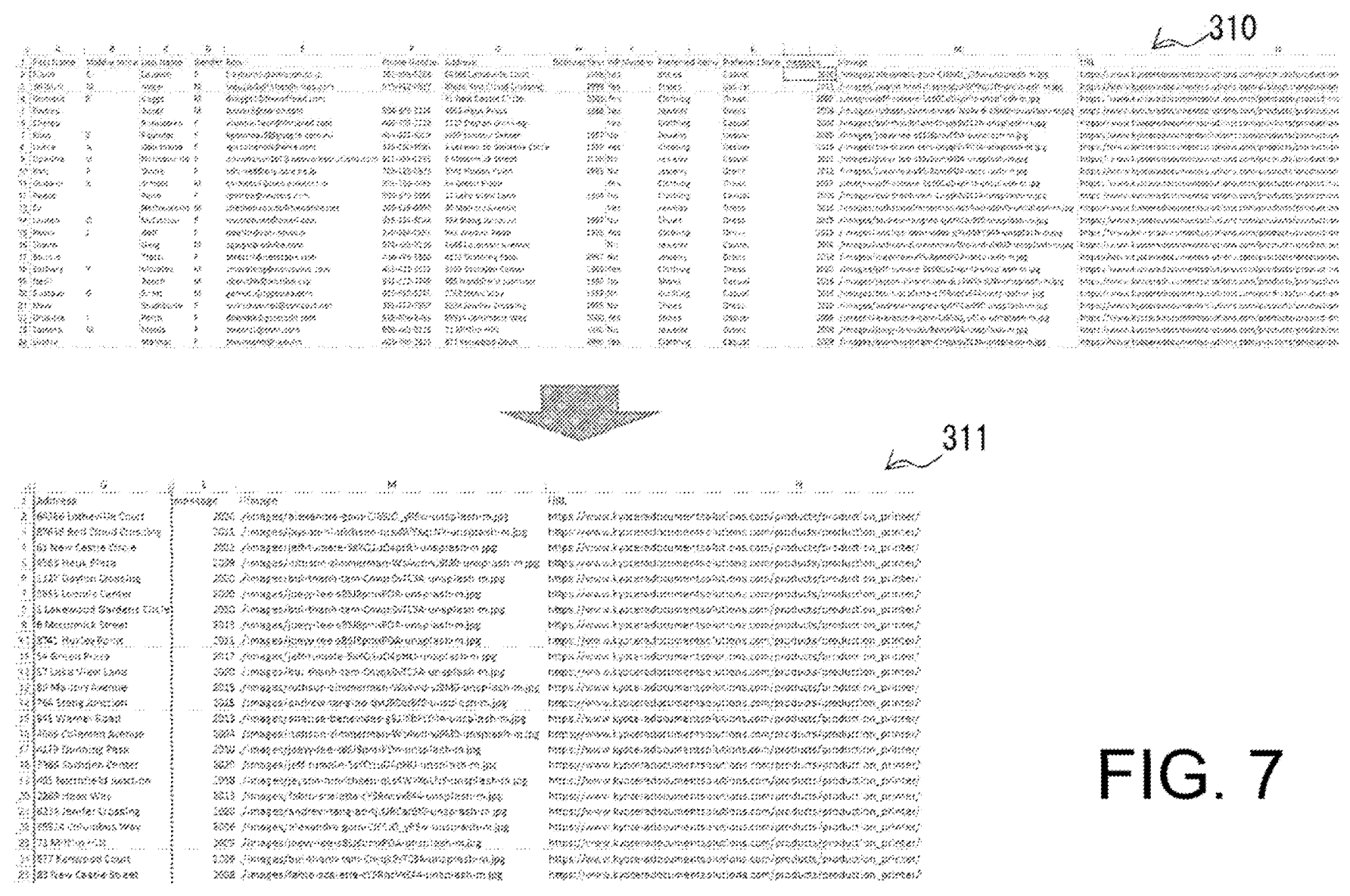

In the example of FIG. 7, the inspection master generating unit 100 generates variable data 311 containing only information used as the data source of the master data 210 from the variable data 310 of the print data 200. In this way, variable data 311 may be a subset of the variable data 310.

Furthermore, the inspection master generating unit 100 can include ID data 320 printed for each record in the print data 200.

Specifically, in each record to be inspected, an object such as letters and numbers of an inspection ID, a one-dimensional or a two-dimensional barcode, or the like, is included in an area outside a cutting area, a cover, or the like, which can be recognized by the inspecting apparatus 3. This allows the printed matter of each record to be identified.

(Step S102)

Then, the processing management unit 110 performs a processing request process.

The processing management unit 110 selects other print server that can process the print data 200. Specifically, the processing management unit 110 selects the print server 1 that is capable of accepting requests as the other print server according to the settings set as the distribution condition. In such case, the processing management unit 110 can determine whether the print data 200 can be processed based on, for example, schedule information, capacity information, or the like, for each print server 1 stored in the storage unit 19.

Figure 8:
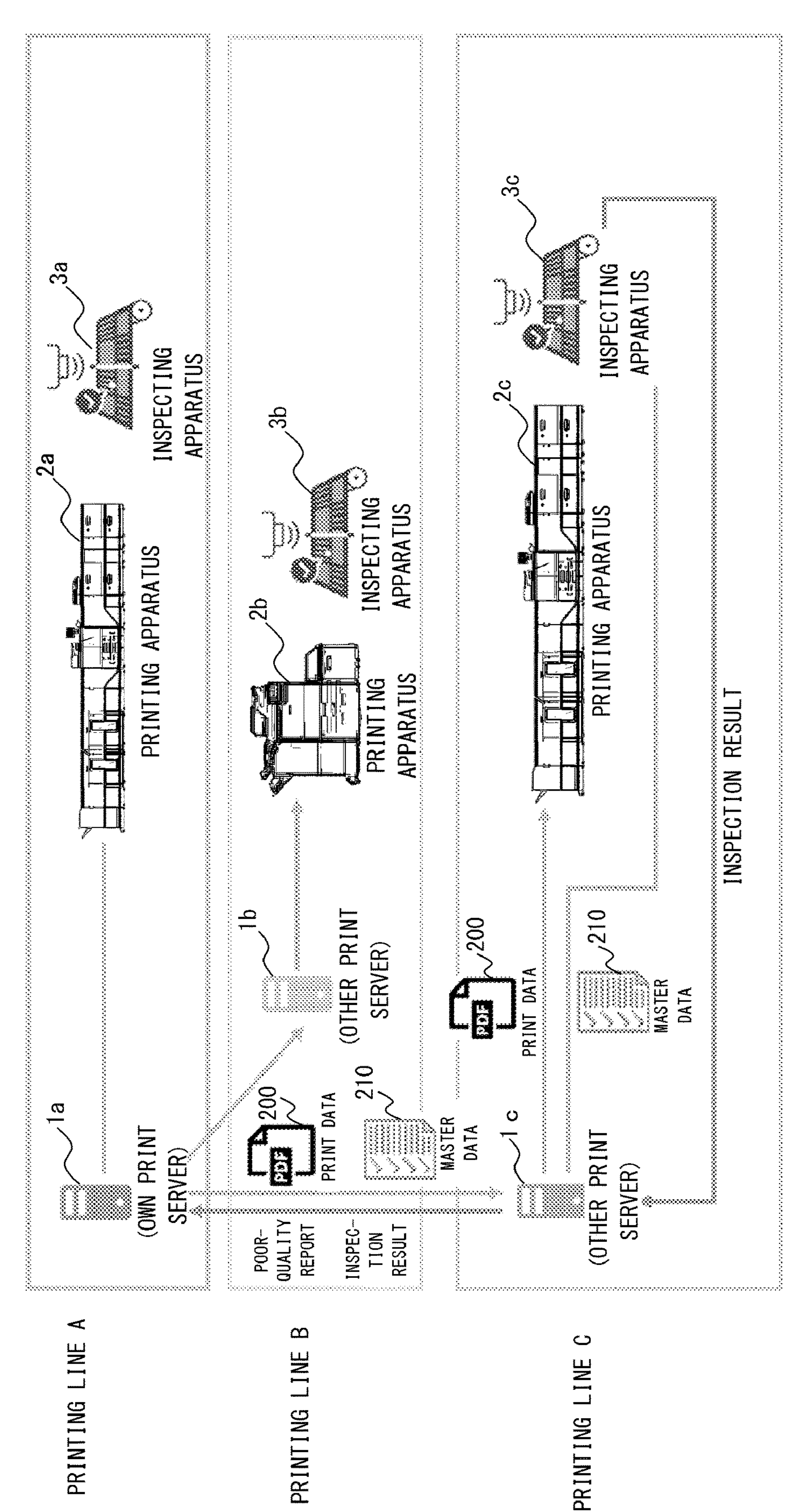
FIG. 8 is a conceptual diagram of data flow and requests in the variable quality guarantee process as shown in FIG. 4.

As refer to FIG. 8, an example in which the processing management unit 110 selects the print server 1*c* of the print line C as the other print server is described.

After the other print server is selected, the processing management unit 110 transmits the print data 200 and the master data 210 generated by the inspection master generating unit 100 to the other print server and requests processing. That is, when the processing management unit 110 transfers the print data 200 to the distribution destination printer, it also sends the inspection master data 210 corresponding to the print data 200.

Specifically, the processing management unit 110 generates a job ticket including print data 200 and master data 210. In such case, the print data 200 and master data 210 may be encrypted. Thus, the processing management unit 110 transmits the job ticket to the selected other print server to request processing.

In the example of FIG. 8, the processing management unit 110 transmits the job ticket including print data 200 and master data 210 to the print server 1*c*.

(Step S201)

Here, a print process executed by the other print servers is described.

In this case, the processing performed by the print server 1*c* selected as the other print server is described. The processing management unit 110 of the other print server (the print server 1*c*) obtains the job ticket from the own print server (the print server 1*a*). Then, the processing management unit 110 performs rasterization processing on each record of the print data 200 to generate rasterized data. The processing management unit 110 stores the rasterized data in the storage unit 19. This rasterized data may be different image data for each record.

Then, the processing management unit 110 causes the connected printing apparatus 2 to output based on the generated rasterized data. As a result, the print data 200 is printed. At this time, ID data 320 is also printed on each record. Note that the processing management unit 110 can also cause the post-processing apparatus to perform post-processing thereafter.

(Step S202)

Then, the processing management unit 110 performs an inspection process.

The processing management unit 110 sends an instruction to the inspecting apparatus 3 to have it perform an inspection based on the master data 210.

The processing management unit 110 transmits master data 210 included in the job ticket to the connected inspecting apparatus 3.

Based on the settings of the master data 210, the inspecting apparatus 3 inspects the printed matter to which the print data 200 has been output. At this time, the inspecting apparatus 3 reads the printed ID to identify the record, compares each object with the master data 210, performs inspection, and outputs the inspection result. The inspecting apparatus 3 transmits the ID of the record and the inspection result to the processing management unit 110. The inspection result also includes information on printed matter that has been found to be good-quality or poor-quality by the inspection.

(Step S203)

Then, the processing management unit 110 determines whether a poor-quality report is necessary or not. The processing management unit 110 determines Yes if the inspection result includes information about an object that exceeds the reporting standard threshold. In the above example, the processing management unit 110 may determine Yes if there is little possibility of improving the print quality of the "fixed image A" and printing is impossible with the printing apparatus 2 of the other print server. Alternatively, the processing management unit 110 may determine Yes when the "barcode data A" results in an error in barcode scanning. Alternatively, the processing management unit 110 may determine Yes if the "variable character strings A or B" do not completely match the character string of the record in the variable data 311 in the master data 210 by the OCR check due to garbled characters or font differences. Alternatively, the processing management unit 110 may determine Yes if the color difference and the number of pixels of the variable image A exceed the thresholds by a specific percentage. In other cases where there is a possibility that the quality is improved by printing again, the processing management unit 110 determines No.

In the case of Yes, the processing management unit 110 advances the processing to step S204.

In the case of No, the processing management unit 110 changes setting based on the inspection result, causes the printing apparatus 2 to print the poor-quality record again, and causes the inspecting apparatus 3 to inspect the poor-quality record again.

(Step S204)

If the poor-quality report is required, the processing management unit 110 performs poor-quality report process.

The other print server sends, as the poor-quality report, that the print quality is poor-quality and does not meet good-quality standard to the own print server, which is the request source. Furthermore, the processing management unit 110 may transmit the inspection result of the printed matter to the requesting own print server, together with the printing results, after printing of all records is completed.

FIG. 8 shows an example in which the poor-quality report and inspection result are sent to the print server 1*a*, which is the own print server.

(Step S103)

Here, the processing of the own print server is explained again. The processing management unit 110 of the own print server (the print server 1*a*) determines whether the poor-quality report has been received or not. If the processing management unit 110 receives the poor-quality report, it determines Yes. In other cases, the processing management unit 110 determines No.

In the case of Yes, the processing management unit 110 advances the processing to step S104.

In the case of No, the processing management unit 110 ends the variable quality guarantee process.

(Step S104)

If receiving the poor-quality report, the processing management unit 110 performs processing request again process.

The processing management unit 110 of the own print server newly selects the other print server 1 according to the distribution condition as a new other print server.

In the example of FIG. 8, the print server 1*b* in print line B is selected as the new other print server.

Then, the processing management unit 110 sends the print data 200 to the new other print server at the selected distribution destination. In the present embodiment, the print data 200 is transmitted to the print server 1*b*. At this time, the processing management unit 110 may transmit the print data 200 as whole as is. Alternatively, only poor-quality records may be extracted and sent to the other print server.

(Step S301)

Here, a print process executed by the new other print server is explained.

In the example of FIG. 8, the print server 1*b* selected as the new other print server performs the printing process. This process may be similar to the process in step S201.

Further, the processing management unit 110 of the print server 1*b* may also perform the poor-quality report process if it is necessary to report the poor-quality again. In this case, the print data 200 may be printed not only on other print lines but also on the print line of the own print server.

With the above, the variable quality guarantee process according to the embodiment of the present disclosure is completed.

As configured in this way, the following effects can be obtained.

In a typical industrial printing system for production printing, in order to efficiently process a large number of print jobs, printing process may be performed in a distributed manner by using a plurality of printing apparatuses. In such distributed processing, when printing is performed by a printing apparatus at a distribution destination, there is a possibility that the print quality is not be as expected due to the settings or status of the printing apparatus, or the like.

Further, variable printing is the most characteristic digital printing job, and it is one of the purposes for printing companies to introduce digital production printing apparatuses. The variable printing is used for personalized printed matter, and the like, so it often involves a large amount of printing. For this reason, there is a technical need to print by a printing apparatus at a distribution destination in the distributed process.

However, as described above, there is a problem in that printing by the printing apparatus at the distribution destination may not provide the expected print quality. In addition, not only when the quality is lower than expected, but even when printing is performed at a higher quality than expected, a problem sometimes arises. That means, for example, if the quality is lower than that high quality at the other distribution destination, a difference occurs, and in the end, the paper can't be used and is to be wasted.

For this reason, there has been a need to ensure that the print results at the distribution destination meet the expectations of the request source.

On the other hand, the industrial printing system X according to the present embodiment is an industrial printing system having a plurality of print servers 1, printing apparatuses 2, and inspecting apparatuses 3 and performing variable printing of print data 200 for production printing, and each of the plurality of print servers 1 includes: an inspection master generating unit 100 that generates master data 210 for inspection in which inspection processing and good-quality standard are set for the print data 200; a processing management unit 110 that transmits the print data 200 and the master data 210 generated by the inspection master generating unit 100 to other print server and request processing; and the inspecting apparatus 3 inspects printed matter of the print data 200 based on the master data 210.

With this configuration, the printing results at the distribution destination are as expected can be guaranteed. That is, in peer-to-peer distributed processing, it is possible to guarantee the print quality of the output from the printing apparatus 2 at the distribution destination. As a result, in variable printing, even if distributed printing is performed at a plurality of sites, quality problems are less likely to occur. That is, printing quality can be guaranteed with appropriate standards. Furthermore, it can prevent variations in print quality due to manual checks, overwork due to printing quality that is higher than necessary, material consumption, and the like.

Further, typical production printing requires a management server that sends and manages data for printing to a plurality of printing apparatuses. In other words, with typical technology, it has been necessary to build a distributed processing system centered around the management server.

On the other hand, the industrial printing system X according to the present embodiment eliminates the need for a management server for distributed processing, flexibly performs distributed processing on a peer-to-peer basis between the print servers 1, and efficient distributed printing can be performed. That is, in the industrial printing system X according to the present embodiment, there is no need to separately prepare a special management server for distributed processing of the print data 200.

Furthermore, in the industrial printing system X, the master data 210 includes variable data 311 for inspecting each record of the print data 200, and the inspecting apparatus 3 inspects each record.

With this configuration, even if variable printing is performed at the distribution destination, each record can be inspected. Furthermore, by including the variable data 311 in the master data 210 for inspection, troubles such as the inspecting apparatus 3 not being able to read the variable data 310 from the print data 200 due to capability, compatibility, configuration issues, or the like, can be prevented.

In the industrial printing system X according to the present embodiment, the print data 200 includes ID data 320 printed for each record, and the inspecting apparatus 3 reads the printed ID to identify the record.

With this configuration, records can be identified at the time of inspection, and inspection can be performed reliably for each record. Furthermore, it is possible to save the effort of manually associating variable data 310 with records during inspection.

In the industrial printing system X according to the present embodiment, the inspection processing and good-quality standard are set for each object of the print data 200.

With this configuration, the inspecting apparatus 3 can perform inspection by using different inspection processing and good-quality standard for each area of an object. Therefore, inspections based on different criteria such as image quality and character print quality can be performed.

In the industrial printing system according to the present embodiment, the other print server selects whether to print again based on the master data 210 or performs the poor-quality report to the own print server requested the processing when the inspecting apparatus 3 determines that the printed matter is poor-quality; and the own print server requested the processing sends the print data 200 corresponding to the printed matter, which has been reported to be the poor-quality, to a print server 1 different from the other print server.

With this configuration, if there is a possibility that the quality is improved by printing again, the burden on the requesting source can be reduced by reprinting. In addition, if the quality cannot be expected to improve even if the printed it again in that printing line, the poor-quality report can be made to the requesting source, and the reprinting can be performed on the other print line. This makes it possible to print reliably while ensuring quality. Additionally, overall printing efficiency can be improved.

Other Embodiments

In addition, in the above embodiment, an example has been described in which the other print server is selected based on the distribution destination setting.

However, the other print servers may be dynamically selected based on the content of the print data 200, the processing standard setting 330, and the like. In this case, a job ticket may be generated by selecting the other print server as a distribution destination for each record. In such case, the print data 200 itself may or may not be changed. In addition, the job ticket to the selected other print server may include only the variable data 311 corresponded to the records for the selected other print server. That means, the print data 200 and/or the master data 210 may be variable for each of the other print servers.

Furthermore, a configuration is also possible: the contents of the print data 200 or the processing standard setting 330 are transmitted and queried to a plurality of the print servers 1 other than the own print server, and the responding print server 1 is selected as the other print server. In such case, a command may be broadcast to the plurality of print servers 1 to inquire as to whether or not processing of the processing standard setting 330 is possible, and the print server 1 whose reply meets the conditions may be selected as the other print server.

With this configuration, it becomes possible to determine and select an appropriate other print server.

Further, in the above-described embodiment, an example has been described in which the variable data 311 is included in the master data 210 in a job ticket, and the processing is requested to the other print server.

However, it is also possible to directly send the variable data 311 itself to the other print server and request processing with the print data 200.

Furthermore, although the above embodiment describes an example in which a URL, or the like, is set in the master data 210, it is also possible to specify an address on the other network or to specify an already acquired print file.

By configuring in this way, a more flexible configuration becomes possible. Furthermore, it becomes possible to determine the other print servers more appropriately. As a result, the amount of effort required for manual adjustments can be reduced, improve processing efficiency, and thus cut down running costs.

Furthermore, the processing management unit 110 does not necessarily select one print server 1 as the other print server. That is, it is also possible to select a plurality of appropriate other print servers.

In this case, it may be possible to set which print server 1 is to be selected as the other print server from the plurality of selected print servers 1 according to the priority order, whether to select it at random, or the like.

With this configuration, even if the variable data 310 requires a large amount of processing, it can be appropriately distributed and processed.

Further, in the above-described embodiment, an example in which inspection is mainly performed after variable printing has been described. However, inspection may be performed after post-processing. For the post-processing inspections, it is also possible to select and distribute the other print server to be distributed to. Furthermore, inspection after printing and after post-processing may be selected for each record.

With this configuration, a print job and a post-processing job can also be distributed and processed more efficiently.

Further, in the above-described embodiment, an example is described in which each record is inspected and a poor-quality is reported.

However, it is also possible to further set another good-quality standard, such as a test print or the first record, or the like, which determines the quality to be unacceptable and immediately performs the poor-quality report as an error. In such case, for example, it is possible to configure good-quality standard such as if the color tone or gradation of a fixed object cannot be improved by printing again, if the characters are garbled, if the specified printing paper or ink is missing, or the like. In such cases, a threshold value may also be set for the configuration.

In addition, in the processing standard settings 330, it is also possible to specify threshold values and settings that are independent of whether or not the print is improved by adjusting the print again.

With this configuration, if the quality of printing cannot be guaranteed, the poor-quality can be reported to the own print server and printing can be performed on a more appropriate print line.

Further, in the above-described embodiment, an example was described in which the variable character strings A and B are determined to match character recognition by OCR check.

However, for the variable character string, a threshold value may be set separately so as to be able to inspect cases where the font is different or blurring occurs. That is, a threshold value for a level that "just needs to be readable" in OCR and a threshold value for a level that detects garbled characters in a font may be set separately. Similarly, multiple threshold values may be set for scanning and barcode scanning. These values may be set in the inspection result and sent to the own print server.

With this configuration, while ensuring a certain level of quality, a more appropriate print line can be selected, and a proper print server 1 can be selected.

Further, in the above-described embodiment, an example has been described in which the same processing standard setting 330 are uniformly used for the print data 200.

However, a processing standard setting 330 can be selected for each print line, each customer group, each print data 200, and each group of records of the print data 200. In this way, it is possible to make a difference in how much printing quality assurance can be tolerated.

With this configuration, appropriate print quality in accordance with customer requests and cost requirements can be guaranteed.

Further, the configuration and operation of the embodiment described above are merely examples, and it goes without saying that the configuration and operation of the embodiment can be modified and executed as appropriate without departing from the aim of the present disclosure.

Also, as the terminology is used herein, the singular forms "a," "an," and "the" include plural forms unless the context clearly dictates otherwise.

What is claimed is:

1. An industrial printing system having a plurality of print servers, printing apparatuses, and inspecting apparatuses and performing variable printing of print data for production printing, wherein each of the plurality of print servers comprises:

an inspection master generating unit configured to generate master data for inspection in which inspection processing and good-quality standard are set for the print data;

a processing management unit configured to transmit the print data and the master data generated by the inspection master generating unit to another print server and request processing;

each of the inspecting apparatuses is configured to inspect printed matter of the print data based on the master data; and the master data includes a character and image master, wherein the character and image master is character data of an object for inspection or image data of an area of the object, and serves as an inspection master for comparison.

2. The industrial printing system according to claim 1, wherein:
the master data includes variable data for inspecting each record of the print data, and
each of the inspecting apparatuses is configured to inspect each record, wherein
the variable data is a subset or reduced data generated by extracting a portion of variable data in the print data.

3. The industrial printing system according to claim 2, wherein:
the print data includes ID data printed for each record, and
each of the inspecting apparatuses is configured to read the ID to identify the record, wherein
the inspection master generating unit is configured to make the ID data printed for each record include in the print data in an area outside a cutting area or a cover, which can be recognized by the inspecting apparatuses.

4. The industrial printing system according to claim 1, wherein:
the inspection processing and good-quality standard are set for each object of the print data, wherein
in the object, the area is identified by categories of fixed character string object, variable character string object, fixed image object, variable image, or barcode data, and
the inspection master generating unit is configured to set the inspection processing and the good-quality standard for inspection in the master data for each identified area.

5. The industrial printing system according to claim 1, wherein:
the other print server is configured to select whether to print again based on the master data or report the poor-quality to a print server, of the plurality of print servers, that requested the processing when an inspecting apparatus of the inspecting apparatuses determines that the printed matter is poor-quality by a threshold value of a reporting standard included in the master data; and
the print server that requested the processing is configured to send the print data corresponding to the printed matter, which has been reported to be the poor-quality, to a print server different from the other print server.

6. The industrial printing system according to claim 5, wherein the system is configured such that
the print server that requested the processing extracts only a defective record and transmits the defective record to a print server different from the other print server.

7. The industrial printing system according to claim 5, wherein the system is configured such that
the print server that requested the processing transmits a command via broadcast to a plurality of print servers to inquire about processing availability and selects the print server whose reply meets the conditions as the other print server.

8. A print server for an industrial printing system that performs variable printing of print data for production printing, comprising:
an inspection master generating unit configured to generate master data for inspection in which inspection processing and good-quality standard are set for the print data;
a processing management unit configured to transmit the print data and the master data generated by the inspection master generating unit to another print server and request processing, wherein
the master data includes a character and image master, wherein the character and image master is character data of an object for inspection or image data of an area of the object, and serves as an inspection master for comparison.

9. The print server according to claim 8, wherein:
the master data includes variable data for inspecting each record of the print data; and
the variable data is a subset or reduced data generated by extracting a portion of variable data in the print data.

10. The print server according to claim 9, wherein:
the print data includes ID data printed for each record; and
the inspection master generating unit is configured to make the ID data printed for each record include in the print data in an area outside a cutting area or a cover, which can be recognized by an inspecting apparatus.

11. The print server according to claim 8, wherein:
the inspection processing and good-quality standard are set for each object of the print data; and
in the object, the area is identified by categories of fixed character string object, variable character string object, fixed image object, variable image, or barcode data, and
the inspection master generating unit is configured to set the inspection processing and the good-quality standard for inspection in the master data for each identified area.

12. The print server according to claim 8, wherein:
the print server is configured such that,
when the print server is one of a plurality of print servers, each of said plurality of print servers having an inspection master generating unit configured to generate master data for inspection in which inspection processing and good-quality standard are set for print data, and a processing management unit configured to transmit print data and the master data generated by the inspection master generating unit to another print server and request processing,
the print server can receive the transmitted print data and the master data and select whether to print again based on the master data or report the poor-quality to a print server that requested the processing when an inspecting apparatus determines that the printed matter is poor-quality by a threshold value of a reporting standard included in the master data; and
when the print server requested the processing, the print server can send the print data corresponding to the printed matter, which has been reported to be the poor-quality, to a print server different from the other print server.

13. A variable printing method executed by an industrial printing system having a plurality of print servers including own print server and other print server and performing variable printing of print data for production printing, comprising the steps of:
by the own print server, generating master data for inspection in which inspection processing and good-quality standard are set for the print data;
by the own print server, transmitting the print data and the generated master data to other print server and requesting processing;
by an inspecting apparatus of the other print server, inspecting printed matter of the print data based on the master data;
wherein the master data includes a character and image master, wherein the character and image master is character data of an object for inspection or image data of an area of the object, and serves as an inspection master for comparison.

14. The variable printing method according to claim 13, wherein:

the master data includes variable data for inspecting each record of the print data; and the method further includes a step of:

by the inspecting apparatus, inspecting each record;

wherein the variable data is a subset or reduced data generated by extracting a portion of variable data in the print data.

15. The variable printing method according to claim 14, wherein:

the print data includes ID data printed for each record; and the method further includes steps of:

by the inspecting apparatus, reading the ID to identify the record, by the own print server, making the ID data printed for each record include in the print data in an area outside a cutting area or a cover, which can be recognized by the inspecting apparatuses.

16. The variable printing method according to claim 13, wherein:

the inspection processing and good-quality standard are set for each object of the print data, in the object, the area is identified by categories of fixed character string object, variable character string object, fixed image object, variable image, or barcode data, and the method further includes a step of: by the own print server, setting the inspection processing and the good-quality standard for inspection in the master data for each identified area.

17. The variable printing method according to claim 13, and further include steps of:

by the other print server, selecting whether to print again based on the master data or report the poor-quality to a print server requested the processing when the inspecting apparatus determines that the printed matter is poor-quality by a threshold value of a reporting standard included in the master data; and by the own print server, sending the print data corresponding to the printed matter, which has been reported to be the poor-quality, to a print server different from the other print server.

18. The variable printing method according to claim 17, comprising extracting, by the print server that requested the processing, only a defective record and transmits the defective record to a print server different from the other print server.

19. The variable printing method according to claim 17, comprising transmitting, by the print server that requested the processing, a command via broadcast to a plurality of print servers to inquire about processing availability and selecting the print server whose reply meets the conditions as the other print server.

* * * * *